United States Patent [19]

Sabee et al.

[11] Patent Number: 5,333,712
[45] Date of Patent: Aug. 2, 1994

[54] SYNCHRONIZED CLUTCH

[75] Inventors: Janet M. Sabee, Franksville; Joseph C. Terranova, New Berlin, both of Wis.

[73] Assignee: Twin Disc, Incorporated, Racine, Wis.

[21] Appl. No.: 47,223

[22] Filed: Apr. 14, 1993

[51] Int. Cl.⁵ .................... F16D 23/04; F16D 23/10; F16D 43/24
[52] U.S. Cl. .................... 192/53 B; 192/48.5; 192/48.7; 192/105 C
[58] Field of Search .................... 192/53 B, 53 R, 48.5, 192/48.7, 105 C, 105 CS

[56] References Cited

U.S. PATENT DOCUMENTS

| | | | |
|---|---|---|---|
| 1,250,687 | 12/1917 | Smith | 192/53 B |
| 1,681,714 | 8/1928 | Tullar | 192/53 R |
| 1,739,946 | 12/1929 | Carhart | 192/53 B X |
| 1,752,062 | 3/1930 | Carhart | 192/63 B |
| 1,755,769 | 4/1930 | Carhart | 192/53 B |
| 2,042,356 | 5/1936 | Nardone | 192/53 R X |
| 2,072,116 | 3/1937 | Lewis | 192/48.7 X |
| 2,259,730 | 10/1941 | Burtnett | 192/53 B X |
| 2,319,784 | 5/1943 | Backus | 192/53 B X |
| 3,063,529 | 11/1962 | Cook | 192/53 B X |
| 3,161,270 | 12/1964 | Aschauer | 192/53 B X |
| 3,252,553 | 5/1966 | Peterson | 192/53 B |
| 3,300,004 | 1/1967 | Peterson | 192/48.5 X |
| 3,491,863 | 1/1970 | Karlsson et al. | 192/53 R |
| 3,547,241 | 12/1970 | Tungate | 192/53 B |
| 3,587,799 | 6/1971 | Chamberland | 192/53 B |
| 4,131,185 | 12/1978 | Schall | 192/53 B |
| 4,555,003 | 11/1985 | Phillips | 192/53 B |

Primary Examiner—Leslie A. Braun
Assistant Examiner—Andrea Pitts
Attorney, Agent, or Firm—Nilles & Nilles

[57] ABSTRACT

A synchronized clutch for coupling a driven element to a drive element includes an externally activated nonpositive coupling, and a positive coupling which engages automatically when the driven element achieves a designated operational state. The nonpositive coupling, preferably comprising at least one friction element permitting some slippage between the drive and driven elements, accelerates the driven element to a velocity which at least approaches synchronization of the drive and driven elements. The positive coupling preferably comprises a sliding drive ring which is responsive to centrifugal weights to positively couple the drive and driven elements at a designated velocity. The external forces actuating the nonpositive coupling are preferably applied manually through a lever. Provision is preferably made for the automatic disengagement of the clutch when the velocity of the driven element decreases below a designated velocity.

25 Claims, 7 Drawing Sheets

SYNCHRONIZED CLUTCH

BACKGROUND OF THE INVENTION

1. Field of the Invention

The invention relates to clutches and, more particularly, relates to synchronized clutches effecting sequential nonpositive and positive connection of a driven element to a drive element.

2. Discussion of the Related Art

Synchronized clutches are known and typically include a nonpositive coupling such as a system of friction discs which initially and nonpositively couple a driven element to a drive element to accelerate the driven element, and a positive coupling such as a pair of mating rings which subsequently positively couple the driven element to the drive element.

One such clutch is disclosed in U.S. Pat. No. 1,681,714 to Tullar. The clutch disclosed by the Tullar patent employs as the nonpositive coupling a plurality of friction discs which serve to accelerate the driven element, and employ as the positive coupling inclined teeth which subsequently lockingly engage a surface element coupled to the flywheel comprising the drive element. Engagement of both the nonpositive coupling and positive coupling of the clutch is controlled by a spring which translates both couplings longitudinally along the shaft forming the driven element upon release of a lever.

The clutch disclosed in the Tullar patent, while being at least to some extent synchronized, exhibits several disadvantages. For instance, operation of both the nonpositive and positive couplings of the clutch is controlled by the same spring, which exerts forces on the clutch which are independent of the rotational speed of the driven shaft. The nonpositive and positive couplings are both parts of the same operation and occur very abruptly because both are initiated when the clutch lever releases the main spring. There is, as a result, no control over synchronization or positive engagement. Thus, positive engagement will always take place regardless of the rotational speed of the drive element, will always occur at a time determined by the constant net actuating force imposed by the main spring, and can be terminated only by manual actuation of a lever to compress the main spring.

Another synchronized clutch, disclosed in U.S. Pat. No. 3,161,270 to Aschauer, also provides sequential nonpositive and positive engagement of a driven shaft to a drive device including a flywheel. However, the friction discs forming the nonpositive coupling of the clutch and the engaging ring comprising the positive coupling are engaged hydraulically rather than by operation of a spring. The pressurized hydraulic fluid can be applied to the nonpositive coupling and positive coupling under independent controls. Thus, positive coupling need not always occur subsequent to nonpositive coupling.

The clutch disclosed by Aschauer, though in some respects arguably superior to that disclosed by Tullar, exhibits drawbacks and disadvantages. For instance Aschauer's clutch, like Tullar's, engages its friction or nonpositive coupling at a rate which is predetermined. That is, the force imposed on the nonpositive friction coupling is constant and is determined by the effective surface area of the piston elements and upon the pressure of the hydraulic fluid used to actuate the clutch. Moreover, engagement of the positive coupling is independent of the rotational speed of the driven element. Also, as in Tullar, disengagement of the positive coupling does not occur automatically upon deceleration of the driven element, but instead requires removal of the application forces through exhaust of pressurized hydraulic fluid from the associated chamber.

Both Tullar and Aschauer also exhibit the drawbacks of being relatively bulky and thus of being poorly suited for use in applications in which weight and/or compactness are of concern. Both devices are also relatively complex, thus rendering them less than ideally suited for applications which require maintenance-free operation for extended periods of time.

OBJECTS AND SUMMARY OF THE INVENTION

It is therefore an object of the invention to provide a synchronized clutch the rate and degree of synchronization of which prior to positive coupling can be controlled by the operator.

It is another object of the invention to provide a synchronized clutch which positively couples driven and drive elements when the driven element achieves a designated operational state.

Still another object of the invention is to provide a synchronized clutch which is compact, simple in construction and operation, reliable, and low maintenance.

In accordance with a first aspect of the invention, these objects are achieved by providing a synchronized clutch including 1) a nonpositive coupling, responsive to an external force, which nonpositively couples the driven element to the drive element to accelerate the driven element, and 2) a positive coupling which automatically and positively couples the driven element to the drive element when the driven element achieves a designated operational state.

Preferably, the rate and degree of synchronization can be varied by varying manual forces forming the external forces. The positive coupling preferably engages when the driven element accelerates above a designated velocity. This positive coupling may be achieved by employing a velocity controlled actuator, preferably comprising a system of centrifugal weights, which actuates the positive coupling to positively couple the driven element to the drive element only upon acceleration of the driven element above the designated velocity.

Still another object of the invention is to provide a synchronized clutch of the type described above which automatically uncouples the driven element from the drive element when the driven element is decelerated below a second predetermined velocity.

In accordance with another aspect of the invention, this object is achieved by providing a return spring which biases a drive ring forming part of the positive coupling away from a hub forming another part of the positive coupling such that, when the shaft comprising the driven element decelerates below the second designated velocity, the return spring disengages the drive ring from the hub.

Still another object of the invention is to provide a system employing a synchronized clutch of the type described above.

In accordance with another aspect of the invention, this object is achieved by providing a system including a rotating drive element, a driven device, and a synchronized clutch which selectively couples the driven device to the drive element. The clutch includes a rotatable shaft connected to the driven device, a nonpositive coupling, and a positive coupling. A portion of the nonpositive coupling is slidable along the rotatable shaft under the imposition of external forces from a first, disengaged position to a second position in which the nonpositive coupling nonpositively couples the rotatable shaft to the drive element and accelerates the shaft. The positive coupling includes 1) a first engagement mechanism rotating with the drive element, 2) a second engagement mechanism which is slidable with respect to the shaft from a first, disengaged position to a second position in which the second engagement mechanism engages the first engagement mechanism to positively couple the shaft to the drive element, and 3) a system of centrifugal weights which, upon rotation of the shaft above a designated velocity, forces the second engagement mechanism into positive engagement with the first engagement mechanism.

Other objects, features, and advantages of the present invention will become apparent to those skilled in the art from the following detailed description. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

The above and other objects of the invention will become more readily apparent as the invention is more clearly understood from the detailed description to follow, reference being made to the accompanying drawings in which like reference numerals represent like parts throughout, and in which.

DETAILED DESCRIPTION OF THE PREFERRED EMBODIMENTS

Resume

The inventive synchronized clutch couples a driven element to a drive element and employs 1) an externally activated nonpositive coupling and 2) a positive coupling which engages automatically when the driven element achieves a designated operational state. The nonpositive coupling, preferably comprising at least one friction element permitting some slippage between the drive and driven elements, accelerates the driven element to a velocity which at least approaches synchronization of the drive and driven elements. The positive coupling preferably comprises a sliding drive ring which is responsive to centrifugal weights to positively couple the drive and driven elements at a designated velocity. The external forces actuating the nonpositive coupling are preferably applied manually through a lever. Provision is preferably made for the automatic disengagement of the clutch when the velocity of the driven element decreases below a designated velocity.

Construction of the Synchronized Clutch

Referring now to FIGS. 1-6, a clutch 10 constructed in accordance with a preferred embodiment of the invention is encased by a housing 12 and selectively couples a driven element 14 to a drive element 16. Clutch 10 is preferably used to actuate a power take-off (PTO) and includes a nonpositive coupling 18 and a positive coupling 20. The nonpositive coupling 18 is actuated by an externally controlled actuator 22, and the positive coupling 20 is actuated by an internally controlled actuator 24 when the driven element 14 achieves a designated operational state which, in the illustrated preferred embodiment, occurs when the driven element 14 accelerates above a designated velocity. In the illustrated embodiment, the driven element 14 comprises a rotatable shaft, the drive element 16 comprises a flywheel of a prime mover such as an internal combustion engine, the externally controlled actuator 22 comprises a manually activated lever assembly, and actuator 24 comprises a system of centrifugal weights.

Figure 1:
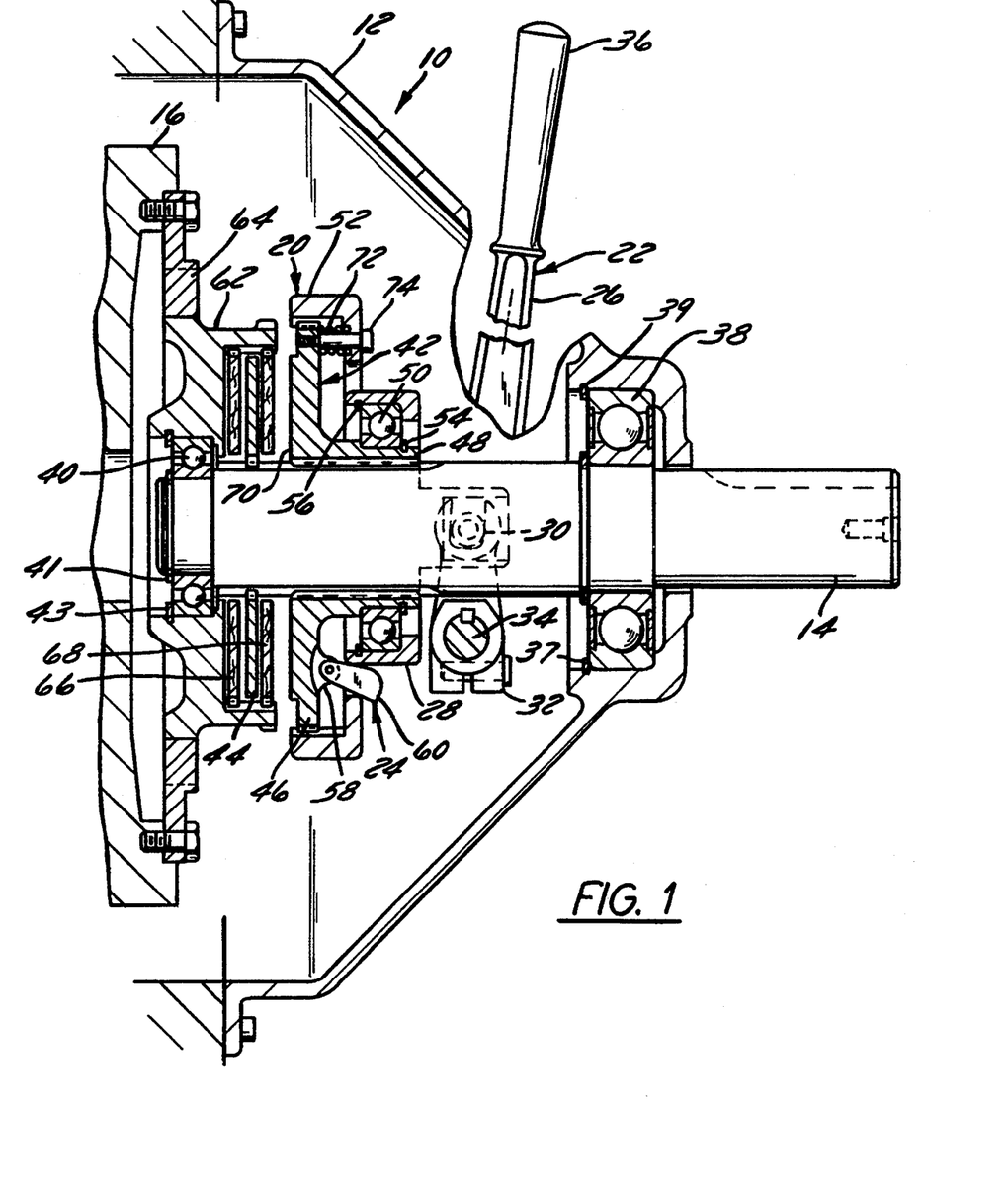
FIG. 1 is a sectional side elevation view illustrating a synchronized clutch, constructed in accordance with a preferred embodiment of the invention, in a first, disengaged, operational state.
Figure 2A:
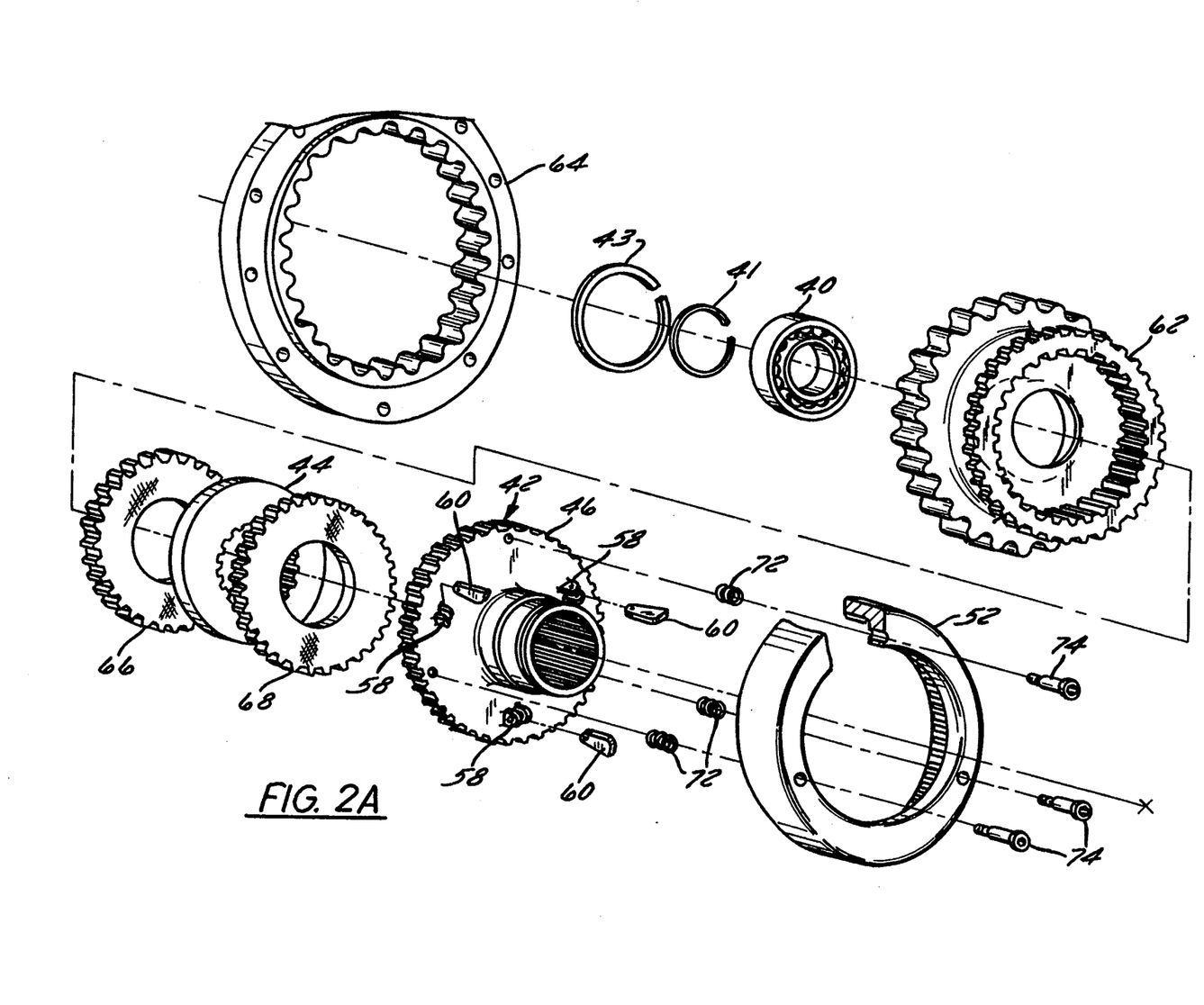
FIGS. 2A and 2B collectively form an exploded perspective view of the synchronized clutch of FIG. 1.
Figure 2B:
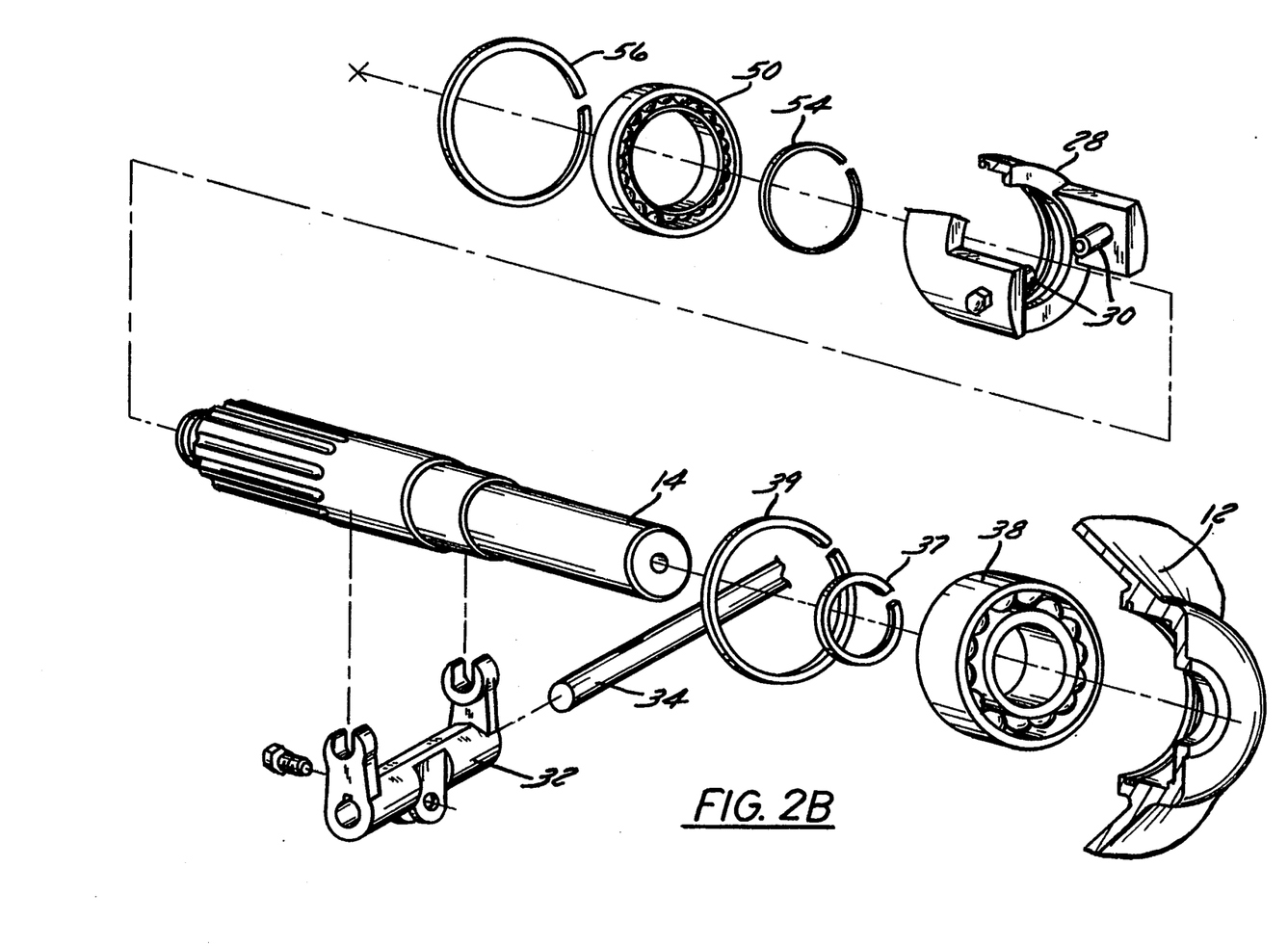

Lever assembly 22 comprises a hand actuated lever 26 pivotally connected to trunnions 30 of a yoke 28 by a crank 32. Lever 26 includes a generally horizontal operating shaft 34 connected to the crank 32 and extending through the side wall of housing 12, and a generally vertical shaft terminating in a grip 36. While the disclosed externally controlled actuator 22 including the lever 26 and associated elements is preferred because it provides a simple and effective mechanism for applying variable actuating forces to a sliding sleeve 42 detailed below, any other suitable actuator could be employed which selectively initiates the clutch engagement cycle by engaging the nonpositive coupling 18. For instance, a hydraulic or electric motor could be used to slide the sleeve 42 towards the associated hub 62.

Shaft 14 forming an output element for the clutch 10, is rotatably supported on the housing 12 and the flywheel 16 by bearings 38 and 40, respectively. The forward end of shaft 14 is splined so as to mesh with sliding sleeve 42 and a metallic clutch plate 44. The rear end of shaft 14 extends longitudinally beyond the rear of the housing 12 and may be splined or include any other suitable device for connection to a device to be driven such as a pump. Longitudinal movement of the shaft 14 and the bearings 38 and 40 with respect to the housing 12 is prevented by snap rings 37, 39, 41, and 43.

Sliding sleeve 42 is mounted on the shaft 14, e.g., by meshing splines, so as to be slidable longitudinally along the shaft 14. Sleeve 42 includes a forward disc 46 and a rear hub 48 formed integral with one another. Hub 48 supports the yoke 28, rotation therebetween being permitted by a pilot bearing 50. Relative longitudinal movement between yoke 28 and pilot bearing 50, as well as between the pilot bearing 50 and the hub 48, are prevented by suitable snap rings 54 and 56 (FIG. 2B). Disc 46 presents an outer radial periphery having teeth which mesh with mating teeth formed on an inner periphery of a drive ring 52 described in more detail below. Disc 46 also presents a front face 70 which is stepped such that the inner portion thereof forms part of the nonpositive coupling 18. The rear face of forward disc 46 has a plurality (three in the illustrated embodiment) of clevises 58 formed thereon, each of which pivotally supports a corresponding centrifugal weight 60.

Each of the centrifugal weights 60 extends between and contacts the drive ring 52 and the outer periphery of yoke 28. These weights essentially act as cams or levers which, upon pivoting radially outwardly upon acceleration of disc 46, drive the drive ring 52 to slide longitudinally of the shaft 14 on the disc 46 towards the flywheel 16. Acceleration of shaft 14 above a velocity generating sufficient centrifugal forces results in the meshing of the inner peripheral teeth of disc 46 with mating outer peripheral teeth formed on an annular hub 62 having a front plate meshing with an adapter ring 64 which is bolted to flywheel 16 and which, along with the sliding sleeve 42 and associated elements, acts as an input element for the clutch 10. Annular hub 62 also has teeth formed on the inner periphery of its rear end which mesh with mating teeth formed on friction discs 66 and 68 which in turn sandwich therebetween the clutch plate 44.

The friction discs 66, 68, clutch plate 44, and front face 70 of forward disc 46 of sliding sleeve 42 together form the nonpositive friction coupling 18. The hub 62, forming a first engagement mechanism, and the drive ring 52, forming a second engagement mechanism, together form the positive coupling 20. Of course, other couplings could replace the illustrated couplings 18 and 20, so long as operation of the clutch 10 results in a nonpositive coupling, followed by a positive coupling upon rotation of the shaft 14 above a designated velocity.

Preferably, provision is made for the automatic disengagement of the clutch 10. In the illustrated embodiment, this automatic disengagement is achieved by providing return springs 72 which bias the drive ring 52 away from the hub 62 against the force of the centrifugal weights 60 and which are held in place by shoulder bolts 74 extending through the drive ring 52 and threadedly engaging disc 46. As can be readily understood, since the driving forces of the weights 60 are a function of the rotational speed of shaft 14, the springs 72 will overcome the forces of weights 60 when the velocity of the shaft 14 drops below a designated velocity to disengage the positive coupling 20. The velocity at which this disengagement occurs can be adjusted by replacing the springs 72 with springs of different spring rates. Since the springs 72 counteract the forces of weights 60, the velocity at which the positive coupling 20 engages is likewise determined at least in part by the biasing forces of the springs 72.

Of course, other disengagement mechanisms could be employed. The disclosed arrangement is preferred, however, because it is particularly simple and compact.

Operation of the Synchronized Clutch

In its disengaged state, the synchronized clutch 10 assumes the position illustrated in FIG. 1, in which the forward disc 46 of sliding sleeve 42 is separated from the friction discs 66 and 68, and in which the drive ring 52 is separated from the hub 62. Thus, while flywheel 16, hub 62 and the associated adapter ring 64, and friction discs 66 and 68 rotate, the shaft 14 and elements connected thereto do not.

Figure 3:
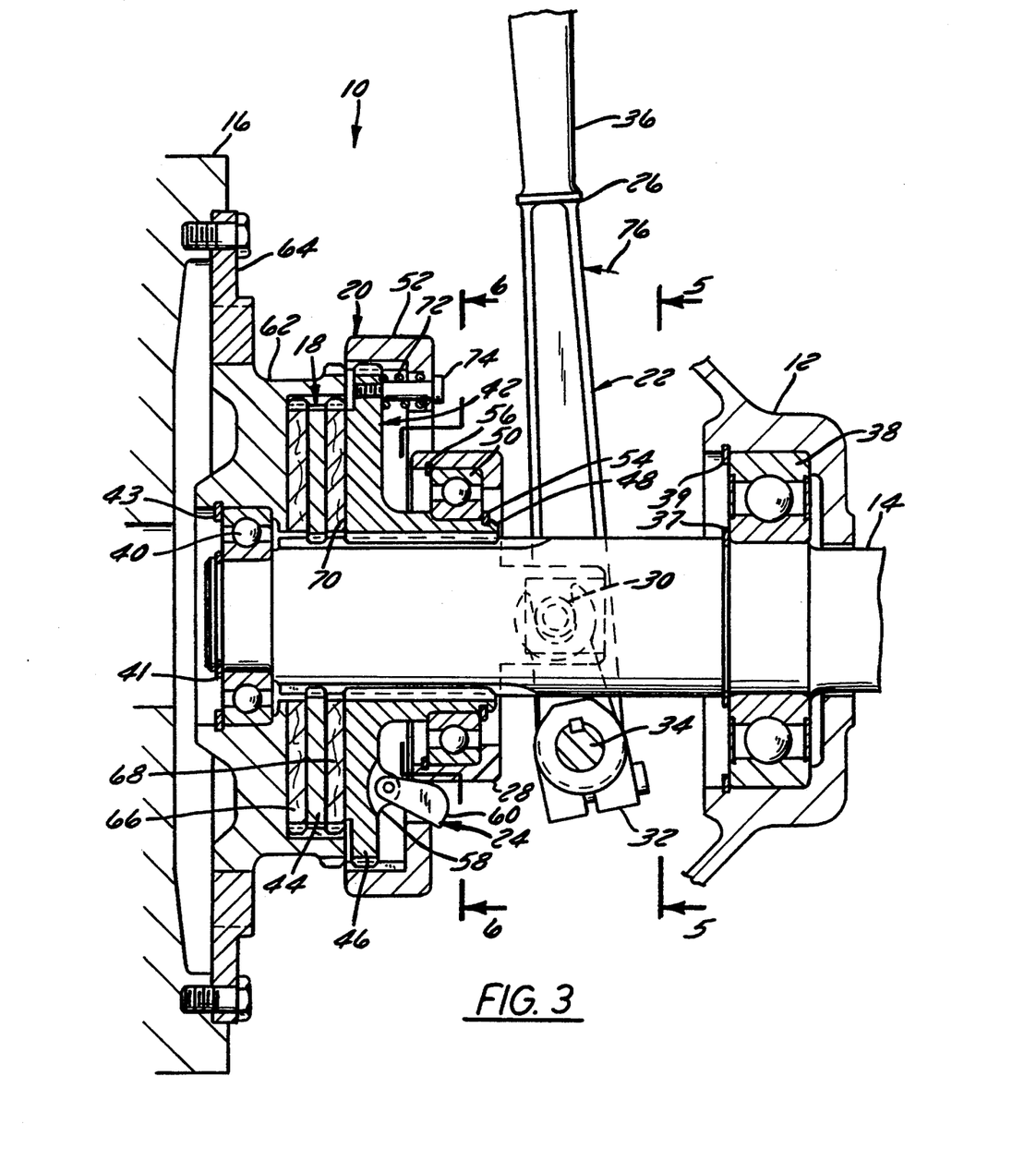
FIG. 3 corresponds to FIG. 1 but illustrates the clutch in a second, partially engaged, operational state.
Figure 4:
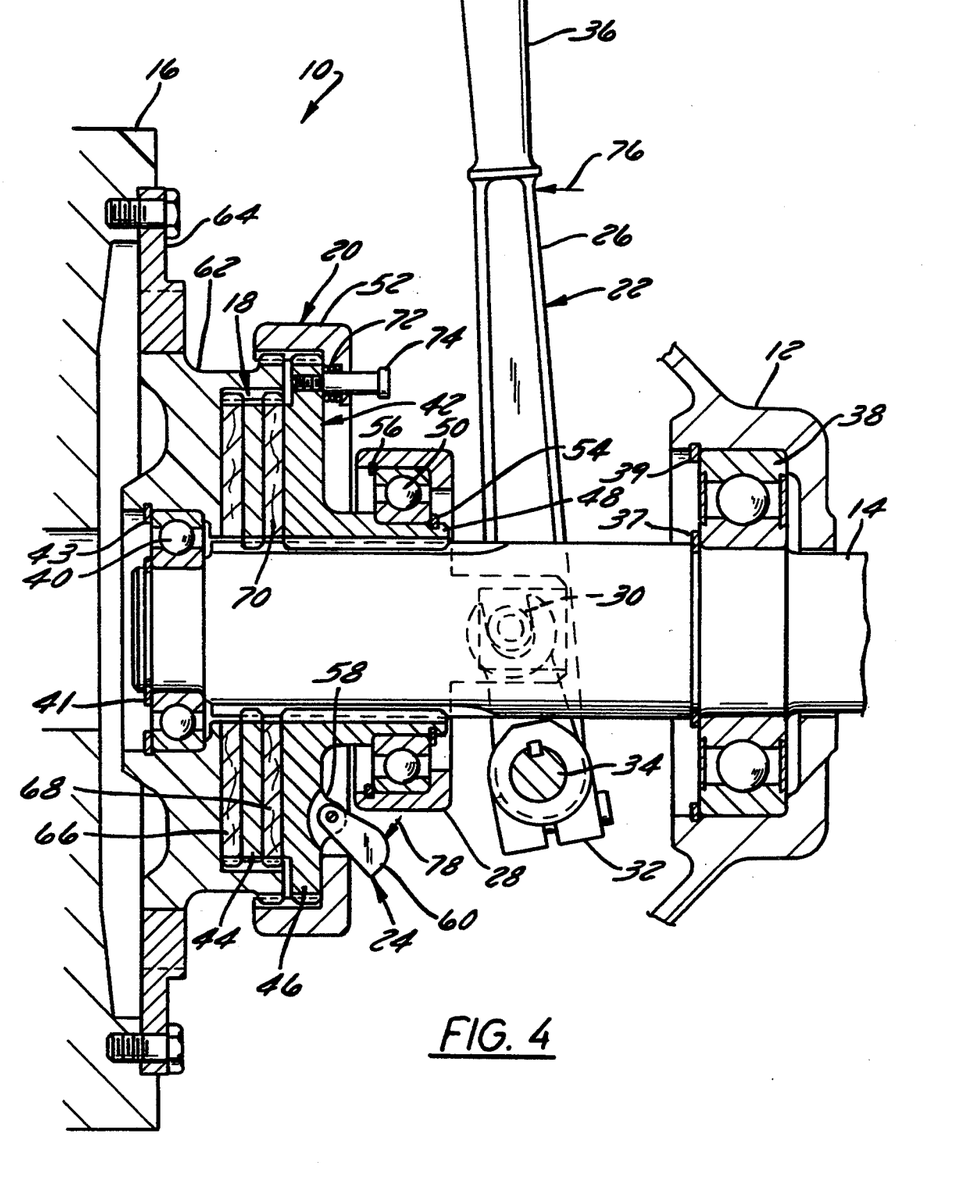
FIG. 4 corresponds to FIGS. 1 and 3 but illustrates the clutch in a third, fully engaged, operational state.
Figure 5:
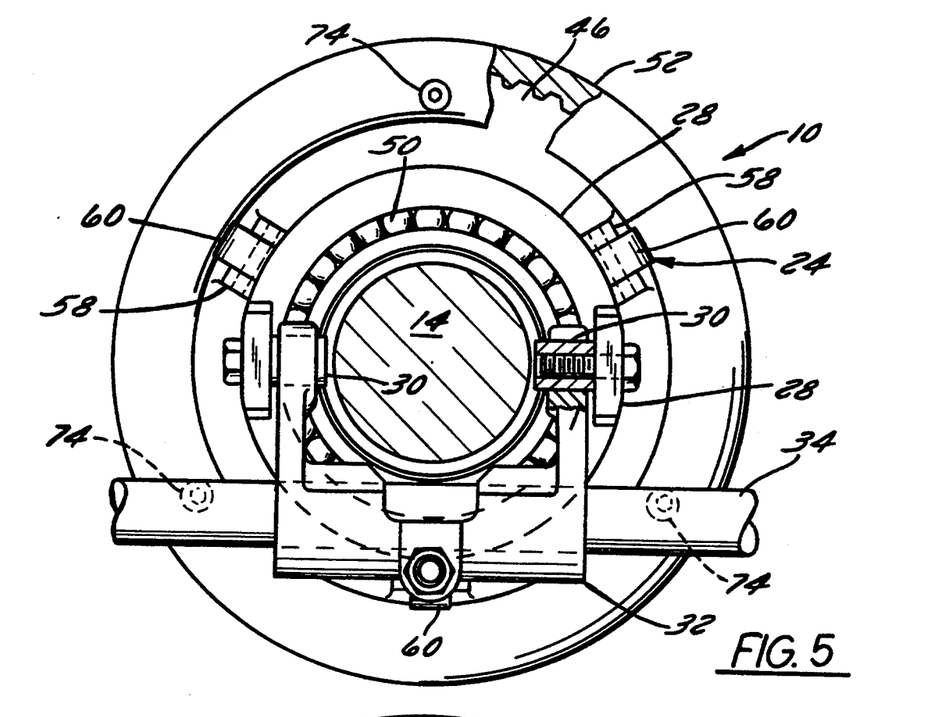
FIG. 5 is a sectional end view taken along the lines 5—5 in FIG. 3.
Figure 6:
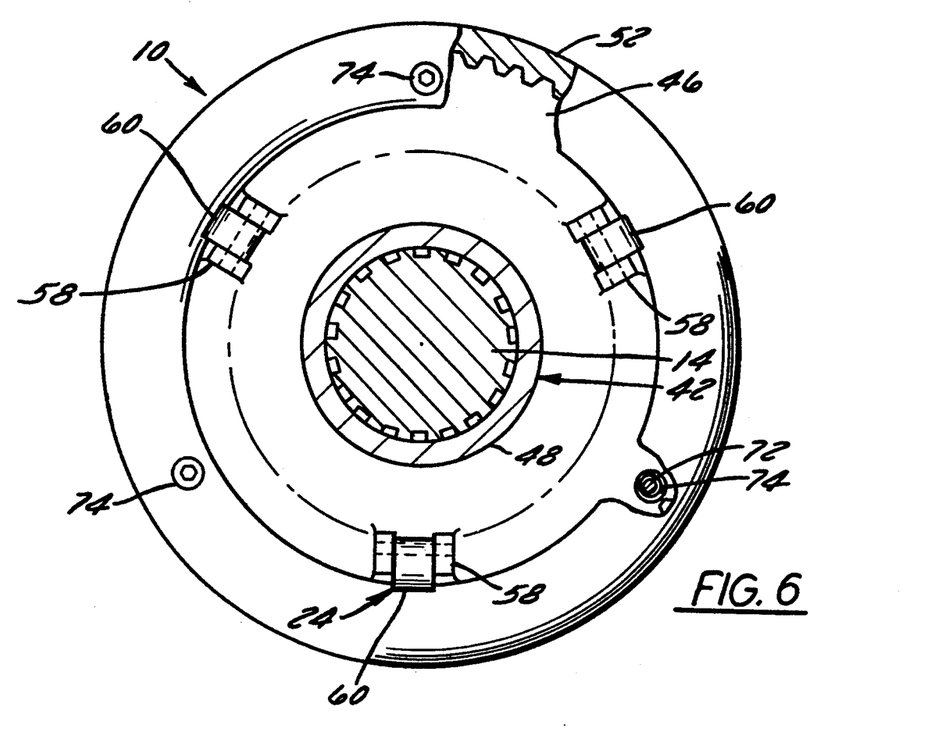
FIG. 6 is a sectional end view taken along the lines 6—6 in FIG. 3.

Assuming now that the operator wishes to engage the clutch, he or she actuates the lever 26 by pivoting it in the direction of arrow 76 in FIGS. 3 and 4. Lever 26 acts through the operating shaft 34 to slide the yoke 28 longitudinally of the shaft 14 towards the flywheel 16. This translation of the yoke advances the sliding sleeve 42 until the front face 70 of disc 46 contacts the friction disc 68 and compresses the friction discs 66 and 68 into contact with the clutch plate 44 and face 70 of disc 46. This contact applies a torque to the shaft 14 which accelerates the shaft 14 while permitting some slippage therebetween.

The actuating forces required for acceleration of shaft 14 are relatively low because only relatively small inertias are involved. This in turn facilitates engagement of the clutch 10.

The amount of torque applied to the shaft 14, and thus the acceleration of the shaft, is dependent upon the friction forces generated by the nonpositive coupling 18, which are in turn dependent upon the actuating force imposed on lever 26 by the operator. Thus, the rate of engagement of the clutch and thus the rate of synchronization can be controlled by the operator simply by varying the forces on lever 26. This may be important in some applications in which gradual acceleration of the driven device powered by the shaft 14 is important.

As the shaft 14 accelerates, centrifugal weights 60 pivot radially outwardly in the direction of arrow 78 in FIG. 4, thus driving the drive ring 52 towards the hub 62 against the force of springs 72 until the inner teeth of the drive ring 52 mesh with the outer teeth of the hub 62 to positively couple the shaft 14 to the flywheel 16. This coupling occurs above a designated velocity at which by the biasing forces of the springs 72 are overcome by the centrifugal forces of the weights 60. Since the positive coupling 20 cannot engage absent these centrifugal forces, clutch 10 has no tendency to self-engage, thus inhibiting unintended engagement. Once positive coupling takes place, the operator can release lever 26, and the positive coupling provided by mechanism 20 will maintain the clutch 10 in its engaged position illustrated in FIG. 4. All torque is transmitted by positive coupling 20, thus saving wear and tear on the discs 66 and 68.

Clutch 10 will remain in its engaged position until an operator manually disengages the clutch by operation of lever 26, or until the rotational speed of shaft 14 drops below the velocity at which the biasing forces of springs 72 overcome the forces imposed on the drive ring 52 by centrifugal weights 60 to disengage the positive coupling 20 formed by the drive ring 52 and the hub 62. In the absence of an actuating force on the lever 26, the remaining torque generated by nonpositive coupling 18 is insufficient to maintain rotation of shaft 14. Even this light torque could be eliminated by employing a spring or some other biasing device to return the sleeve 42 to the position illustrated in FIG. 1. As discussed above, the velocity below which disengagement of positive coupling 20 occurs can be varied prior to assembly by replacing springs 72 with springs of different spring rates. It can thus be seen that the clutch 10 is remarkably simple in construction and operation but at the same time has a high torque capacity and permits significant flexibility in not only the rate of synchronization, but also in the velocity at which automatic engagement and disengagement of the positive coupling 20 occur. This simplicity of design, coupled with the fact that the clutch need not be adjusted and is sealed, renders clutch 10 virtually maintenance free. The clutch is also very compact and thus can be encased in a relatively small housing 12. The use of an inverted design incorporating only a single pilot bearing also permits clutch 10 to be used with any engine. Clutch 10 can also be adapted to fit virtually any-sized flywheel simply by replacing adapter ring 64 with a different-sized ring.

Exemplary Application of Synchronized Clutch

The combination of features detailed above renders the clutch 10 well suited for use in applications which demand that the clutch run unsupervised for extended periods of time, and in which the clutch is to be contained in a relatively small space. For instance, referring to FIG. 7, the clutch 10 could be used in a PTO coupling an engine 102 of an irrigation system 100 to a pump 104 which supplies water to an irrigation pipeline 106. Shaft 14 may be connected to pump 104 via a conventional PTO shaft 108. The shaft 14 thus constitutes a driven element, transferring the torque of the drive element to a driven device formed by the pump 104. The pump 10 could be located in a separate casing 12 as illustrated or, being relatively compact, could be encased in the existing casing of engine 102.

Figure 7:
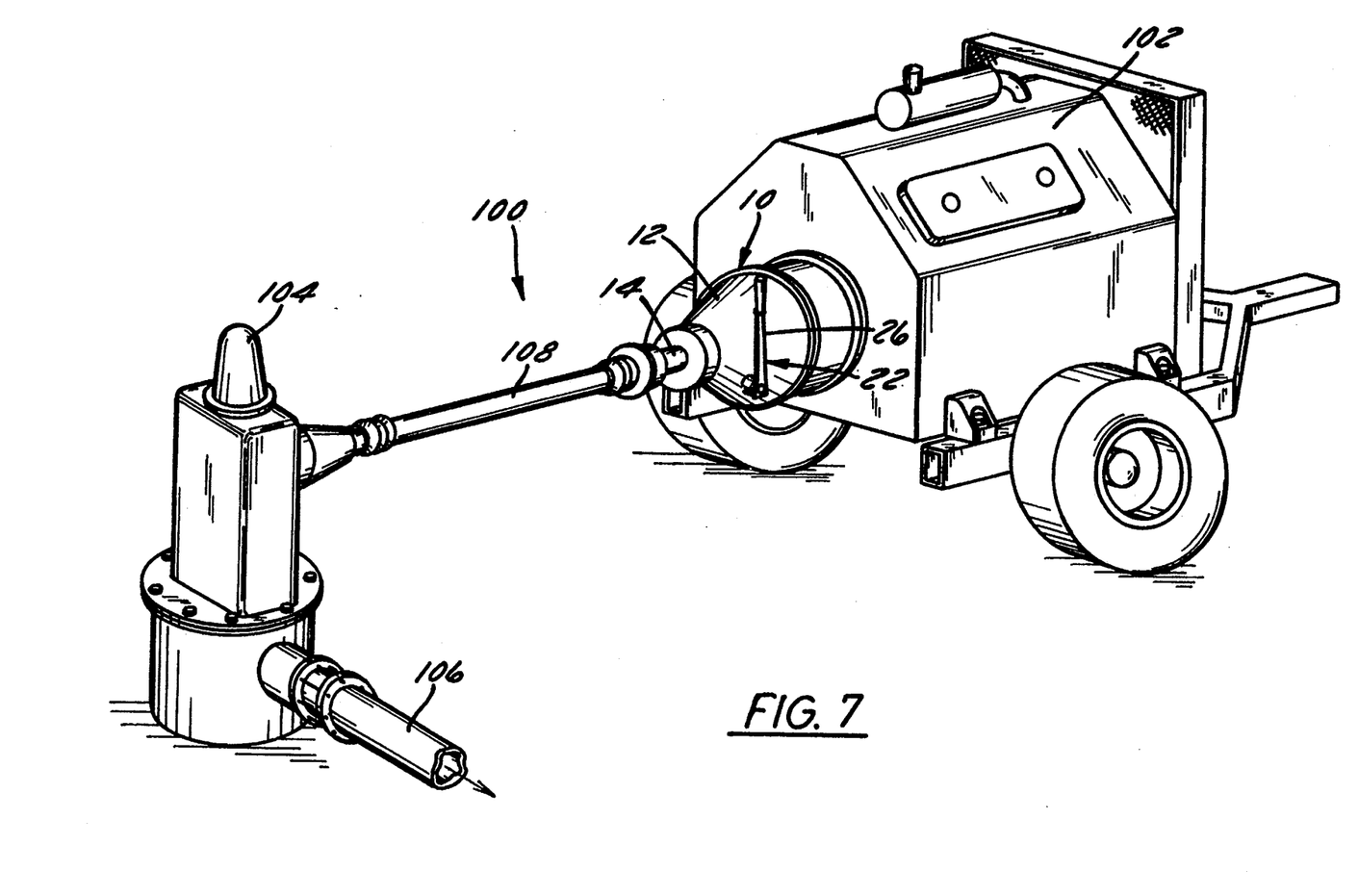
FIG. 7 illustrates one possible application of the synchronized clutch of FIGS. 1-6.

Because the clutch 10 need not be manually supervised or operated after its initial engagement, the use of this clutch in irrigation system 100 permits this system to operate on its own for extended periods of time without supervision. Should the pump 104 fail or the system malfunction in any other way so as to decrease the velocity of the shaft 14 below the designated velocity discussed above, clutch 10 will automatically disengage to uncouple the pump 104 from the engine 102, thus inhibiting damage to the system.

Many changes and modifications could be made to the invention without departing from the spirit and scope thereof. For instance, the discs 66, 68, clutch plate 44, and flat face 70 of disc 46 could be replaced by a cone clutch or any other device providing nonpositive coupling of the shaft 14 to the flywheel 16 upon the imposition of an external actuating force. In addition, any number of centrifugal weights could be provided in the same or different locations. These weights could actually be replaced by other devices which automatically engage the positive coupling 20 when the shaft 14 rotates above a designated velocity or achieves some other designated operational state.

Other changes and modifications which could be made to the disclosed clutch without departing from the spirit and scope of the invention will become more readily apparent from a reading of the appended claims.

We claim:

1. A system comprising:
   (A) a drive element;
   (B) a synchronized clutch for selectively coupling said driven element to said drive element, said synchronized clutch including
      (1) a driven element,
      (2) a non-positive coupling, responsive to external actuation forces, which nonpositively couples said driven element to said drive elements to accelerate said driven element;
      (3) a positive coupling which positively couples said driven element to said drive element; and
      (4) a velocity controlled actuator which employs centrifugal forces to actuate said positive coupling to positively couple said driven element to said drive element only upon acceleration of said driven element above a designated velocity.

2. A system according to claim 1, wherein said actuator comprises a system of centrifugal weights attached to said positive coupling.

3. A synchronized clutch comprising:
   (A) an input element;
   (B) a driven element;
   (A) a nonpositive coupling, responsive to external actuation forces, which nonpositively couples said driven element to said input element to accelerate said driven element;
   (B) a positive coupling which positively couples said driven element to said input element; and
   (C) a velocity controlled actuator which employs centrifugal forces to actuate said positive coupling to positively coupled said driven element to said input element only upon acceleration of said driven element above a designated velocity.

4. A synchronized clutch according to claim 3, wherein said input element comprises an adapter ring, and said driven element comprises a shaft.

5. A synchronized clutch according to claim 3, wherein said actuator comprises a system of centrifugal weights operatively connected to a portion of said positive coupling.

6. A system comprising:
   (A) a drive element;
   (C) a synchronized clutch for selectively coupling said driven element to said drive element, said synchronized clutch including
      (1) a driven element,
      (2) a nonpositive coupling, responsive to an external force, which nonpositively couples said driven element to said drive element to accelerate said driven element, and
      (3) a positive coupling which automatically and positively couples said driven element to said drive element when centrifugal forces created by rotation of said driven element increase above a designated level.

7. A system according to claim 6, wherein said positive coupling is responsive to a system of centrifugal weights which actuates said positive coupling upon acceleration of said driven element above a designated velocity, thereby applying said centrifugal forces.

8. A synchronized clutch comprising:
   (A) a rotatable input element;
   (B) a rotatable shaft;
   (C) a nonpositive coupling, a portion of which is slidable along said shaft under the imposition of external forces from a first, disengaged position to a second position in which said nonpositive coupling nonpositively couples said shaft to said input element and accelerates said shaft; and
   (D) a positive coupling including
      (a) a first engagement mechanism rotating with said input element;
      (b) a second engagement mechanism which is slidable with respect to said shaft from a first, disengaged position to a second position in which said second engagement mechanism engages said first engagement mechanism to positively couple said shaft to said input element, and
      (c) a system of centrifugal weights which, upon rotation of said shaft above a designated velocity, forces said second engagement mechanism into positive engagement with said first engagement mechanism.

9. A synchronized clutch according to claim 8, wherein said input element comprises an adapter ring.

10. A synchronized clutch according to claim 8, further comprising a manually operated lever which applies said external forces to said portion of said nonpositive coupling.

11. A synchronized clutch according to claim 10, further comprising a yoke which is connected to said lever and which applies the actuating forces of said lever to said portion of said nonpositive coupling.

12. A synchronized clutch according to claim 8, wherein said portion of said nonpositive coupling includes a disc which is formed on a sleeve slidably mounted on said shaft and which, when slid into said second position, engages a friction disc rotating with said input element and forming another portion of said nonpositive coupling.

13. A synchronized clutch according to claim 12, further comprising
  a yoke which applies said external forces to said sleeve and to said disc, and
  a pilot bearing which supports said yoke on said sleeve.

14. A synchronized clutch according to claim 12, wherein said first engagement mechanism includes a hub and said second engagement mechanism includes a drive ring which is slidably mounted on said sleeve.

15. A synchronized clutch according to claim 14, wherein said centrifugal weights are pivotally mounted on said sleeve and contact said drive ring.

16. A synchronized clutch according to claim 14, further comprising a return spring which biases said drive ring away from said sleeve and said hub such that, when said shaft decelerates below a second designated velocity, said return spring disengages said drive ring from said hub.

17. A synchronized clutch according to claim 16, wherein said return spring is replaceable.

18. A system comprising:
  (A) a drive element;
  (B) a driven device; and
  (C) a synchronized clutch for selectively coupling said driven device to said drive element, said synchronized clutch including
    (1) a rotatable shaft which is connectable to said driven device;
    (2) a plurality of friction discs which rotate with said drive element;
    (3) a sleeve which is mounted on said shaft and which is slidable along said shaft under the imposition of external forces from a first, disengaged position to a second position in which said friction discs nonpositively couple said sleeve to said drive element and accelerate said shaft, said sleeve having external teeth formed thereon;
    (4) a yoke which applies external forces to said sleeve and which is supported on said sleeve by a pilot bearing;
    (5) a manually operated lever which applies said external forces to said yoke; and
    (6) a positive coupling including
      (a) a hub which rotates with said drive element, which has internal teeth formed thereon meshing with said friction discs, and which has external teeth formed thereon,
      (b) a drive ring which has internal teeth formed thereon meshing with said external teeth of said sleeve and which is slidable along said sleeve from a first, disengaged position to a second position in which said internal teeth on said drive ring mesh with said external teeth on said hub to positively couple said shaft to said drive element,
      (c) a system of centrifugal weights which are pivotally mounted on said sleeve and which, upon rotation of said shaft above a designated velocity, pivot radially outwardly to force said drive ring from said first position to said second position, and
      (d) a return spring which biases said drive ring towards said first position and which, upon deceleration of said shaft below a second designated velocity, forces said drive ring into said first position.

19. A synchronized clutch according to claim 18, wherein the return spring is replaceable.

20. A system comprising:
  (A) a rotating drive element;
  (B) a driven device; and
  (C) a synchronized clutch which selectively couples said driven device to said drive element and which includes
    (1) a rotatable shaft connected to said drive device,
    (2) a nonpositive coupling, a portion of which is slidable along said shaft under the imposition of external forces from a first, disengaged position to a second position in which said nonpositive coupling nonpositively couples said shaft to said drive element and accelerates said shaft, and
    (3) a positive coupling including
      (a) a first engagement mechanism rotating with said drive element,
      (b) a second engagement mechanism which is slidable with respect to said shaft from a first, disengaged position to a second position in which said second engagement mechanism engages said first engagement mechanism to positively couple said shaft to said drive element, and
      (c) a system of centrifugal weights which, upon rotation of said shaft above a designated velocity, forces said second engagement mechanism into positive engagement with said first engagement mechanism.

21. The system according to claim 20, wherein said drive element comprises a flywheel of an engine and said driven device comprises a pump of an irrigation system.

22. A method of coupling a rotatable driven element of a clutch to a rotating input element of said clutch, comprising the steps of:
  (A) applying an external force to said driven element to nonpositively couple said driven element to said input element, thereby accelerating said driven element by said input element; and, when the velocities of said driven element and said input element are at least partially synchronized,
  (B) applying centrifugal forces to said driven element which positively couple said driven element to said input element.

23. A method according to claim 22, wherein said external force is a manual force, and wherein a rate of synchronization is varied by varying said manual force.

24. A method according to claim 22, further comprising the step of automatically disengaging said clutch when the velocity of said driven element drops below a designated velocity.

25. A method according to claim 24, further comprising adjusting said designated velocity.

* * * * *

UNITED STATES PATENT AND TRADEMARK OFFICE
CERTIFICATE OF CORRECTION

PATENT NO. : 5,333,712
DATED : August 2, 1994
INVENTOR(S) : Sabee, et al.

It is certified that error appears in the above-indentified patent and that said Letters Patent is hereby corrected as shown below:

Col. 7, line 55, delete "for selectively coupling";
      line 56, delete "said driven element to said drive element, said";
      line 57, delete "synchronized clutch" ;
      line 62, delete "elements" and substitute -- element --.
Col. 8, line 17, delete "coupled" and substitute -- couple --;
      line 29, delete "for selectively coupling";
      line 30, delete "said driven element to said drive element, said";
      line 31, delete "synchronized clutch".

Signed and Sealed this

Second Day of May, 1995

Attest:

BRUCE LEHMAN

Attesting Officer      *Commissioner of Patents and Trademarks*